(12) United States Patent
Grubb et al.

(10) Patent No.: US 7,451,009 B2
(45) Date of Patent: Nov. 11, 2008

(54) METHOD AND APPARATUS FOR PRODUCT DEFECT CLASSIFICATION

(75) Inventors: David Grubb, Doylestown, PA (US); Tom Doblmaier, North Wale, PA (US); Glen P. Goffin, Dublin, PA (US); Evan A. Groat, Lansdale, PA (US); Steven M. Mensoff, Blue Bell, PA (US); Dan Quigley, Woodinville, WA (US)

(73) Assignee: General Instrument Corporation, Horsham, PA (US)

( * ) Notice: Subject to any disclaimer, the term of this patent is extended or adjusted under 35 U.S.C. 154(b) by 249 days.

(21) Appl. No.: 11/316,128

(22) Filed: Dec. 22, 2005

(65) Prior Publication Data

US 2007/0150084 A1  Jun. 28, 2007

Related U.S. Application Data

(60) Provisional application No. 60/714,921, filed on Sep. 7, 2005.

(51) Int. Cl.
*G06F 19/00* (2006.01)

(52) U.S. Cl. .......................... 700/110; 702/35; 702/185

(58) Field of Classification Search .......... 700/108–110; 702/81, 82, 35, 179, 180, 182, 183, 185; 382/145, 147, 149, 168
See application file for complete search history.

(56) References Cited

U.S. PATENT DOCUMENTS

| | | | | |
|---|---|---|---|---|
| 5,818,953 A | * | 10/1998 | Queisser et al. | 382/165 |
| 5,917,332 A | * | 6/1999 | Chen et al. | 382/149 |
| 6,092,059 A | * | 7/2000 | Straforini et al. | 706/14 |
| 6,334,097 B1 | * | 12/2001 | Yoshitake et al. | 702/185 |
| 6,456,951 B1 | * | 9/2002 | Maeda et al. | 702/81 |
| 6,701,259 B2 | * | 3/2004 | Dor et al. | 702/35 |
| 6,741,940 B2 | * | 5/2004 | Mugibayashi et al. | 700/110 |
| 6,982,556 B2 | * | 1/2006 | Chung | 324/527 |

* cited by examiner

*Primary Examiner*—Albert DeCady
*Assistant Examiner*—Charles R Kasenge
(74) *Attorney, Agent, or Firm*—Stewart M. Wiener

(57) ABSTRACT

Method and apparatus for processing defect data indicative of defects in a product is described. In one example, each of the defects is assigned one of a plurality of severity levels and one of a plurality of impact levels. The defects are classified into categories based on combinations of severity level and impact level. A graphic representative of a topographical relation among numbers of defects in the categories is generated. The graphic is displayed on a graphical user interface (GUI).

19 Claims, 6 Drawing Sheets

| DESCRIPTION | IDENTIFIER | SEVERITY | IMPACT |
|---|---|---|---|
| | | | |
| | | | |
| ⋮ | ⋮ | ⋮ | ⋮ |
| | | | |

FIG. 3

METHOD AND APPARATUS FOR PRODUCT DEFECT CLASSIFICATION

CROSS-REFERENCE TO RELATED APPLICATIONS

This application claims benefit of U.S. provisional patent application Ser. No. 60/714,921, filed Sep. 7, 2005, which is incorporated by reference herein.

BACKGROUND OF THE INVENTION

1. Field of the Invention

Embodiments of the present invention generally relate to product analysis and, more particularly, to a method and apparatus for product defect classification.

2. Description of the Related Art

Companies that supply products and services to end users track defects associated with such products and services (generally referred to as product defects). Product defects may be discovered before the product is released on a wide scale, such as during manufacture of a product or during beta testing of a product. Product defects may also be discovered after the product is released, such as through technical support calls from end users. Not all defects affect the product in the same way. For example, some defects affect the core functionality of a product such that the product cannot be used for its intended purpose. Other defects affect non-core functions and do not cause the product to be unusable. While the former defects may require an immediate action, the latter may not. Since there are many different types of defects that require various actions, merely storing a list of defects as such defects are discovered for a product is not an efficient product analysis mechanism. Accordingly, there exists a need in the art for an improved method and apparatus for product defect classification.

SUMMARY OF THE INVENTION

Method and apparatus for processing defect data indicative of defects in a product is described. In one embodiment, each of the defects is assigned one of a plurality of severity levels and one of a plurality of impact levels. The defects are classified into categories based on combinations of severity level and impact level. A graphic representative of a topographical relation among numbers of defects in the categories is generated. The graphic is displayed on a graphical user interface (GUI).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates an exemplary format for classified defect data in accordance with one or more aspects of the invention;

DETAILED DESCRIPTION

Figure 1:
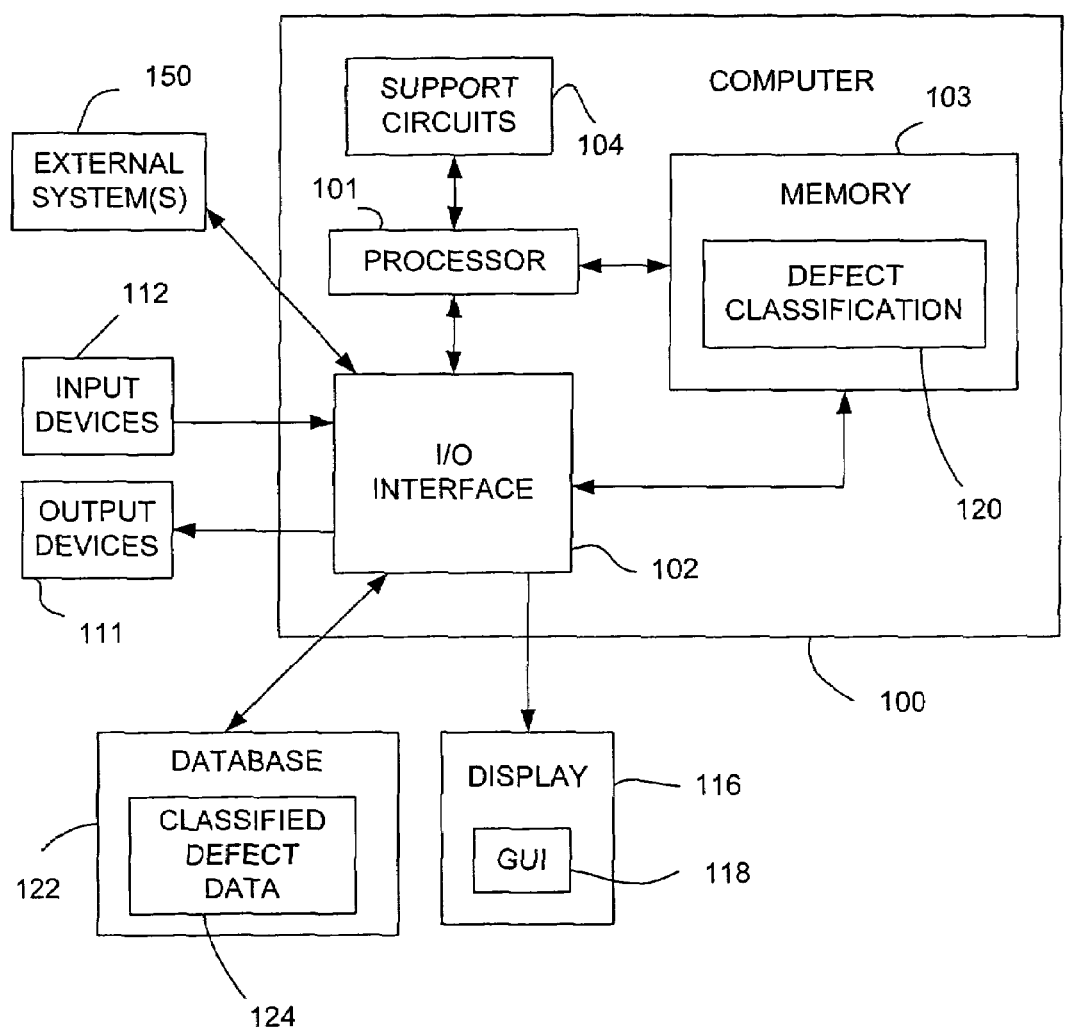
FIG. 1 is a block diagram depicting an exemplary embodiment of a computer configured to implement the processes and methods described herein.

FIG. 1 is a block diagram depicting an exemplary embodiment of a computer 100 configured to implement the processes and methods described herein. The computer 100 includes a processor 101, a memory 103, various support circuits 104, and an I/O interface 102. The processor 101 may be any type microprocessor known in the art. The support circuits 104 for the processor 101 include conventional cache, power supplies, clock circuits, data registers, I/O interfaces, and the like. The I/O interface 102 may be directly coupled to the memory 103 or coupled through the processor 101. The I/O interface 102 may be coupled to various input devices 112 and output devices 111, such as a conventional keyboard, mouse, printer, and the like, as well as a display 116. The I/O interface 102 is further coupled to a database 122. The I/O interface 102 may also be coupled to one or more external systems 150 (e.g., via a network).

The memory 103 may store all or portions of one or more programs and/or data to implement the processes and methods described herein. Notably, the memory 103 may store program code to be executed by the processor 101 for implementing a defect classification system 120. The memory 103 may include one or more of the following random access memory, read only memory, magneto-resistive read/write memory, optical read/write memory, cache memory, magnetic read/write memory, and the like, as well as signal-bearing media as described below. The database 122 may comprise a portion of the memory 103 for the computer. Alternatively, the database 122 may be more sophisticated, such as a database server configured with a well-known database platform (e.g., database software commercially available from Oracle Corporation).

The computer 100 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 103. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

In operation, a user interacts with the defect classification system 120 via one or more of the input devices 112, the output devices 111, and a graphical user interface (GUI) on the display 116. The defect classification system 120 receives data indicative of product defects ("product defect descriptions") from the external systems 150 for one or more products. The term "product" is meant to include both products and services. The external systems 150 may include various systems for tracking defects in products, such as technical support systems, quality control systems, and the like. A user interacts with the defect classification system 120 to classify the product defect descriptions. Classified defect data 124 may be stored in the database 122 for the product(s). Information derived from the classified defect data 124 may be displayed to a user via the GUI 118. The classified defect data 124 may be updated periodically via user interaction with the GUI 118. An exemplary embodiment of the defect classification system 120 is described immediately below with respect to FIG. 2.

Figure 2:
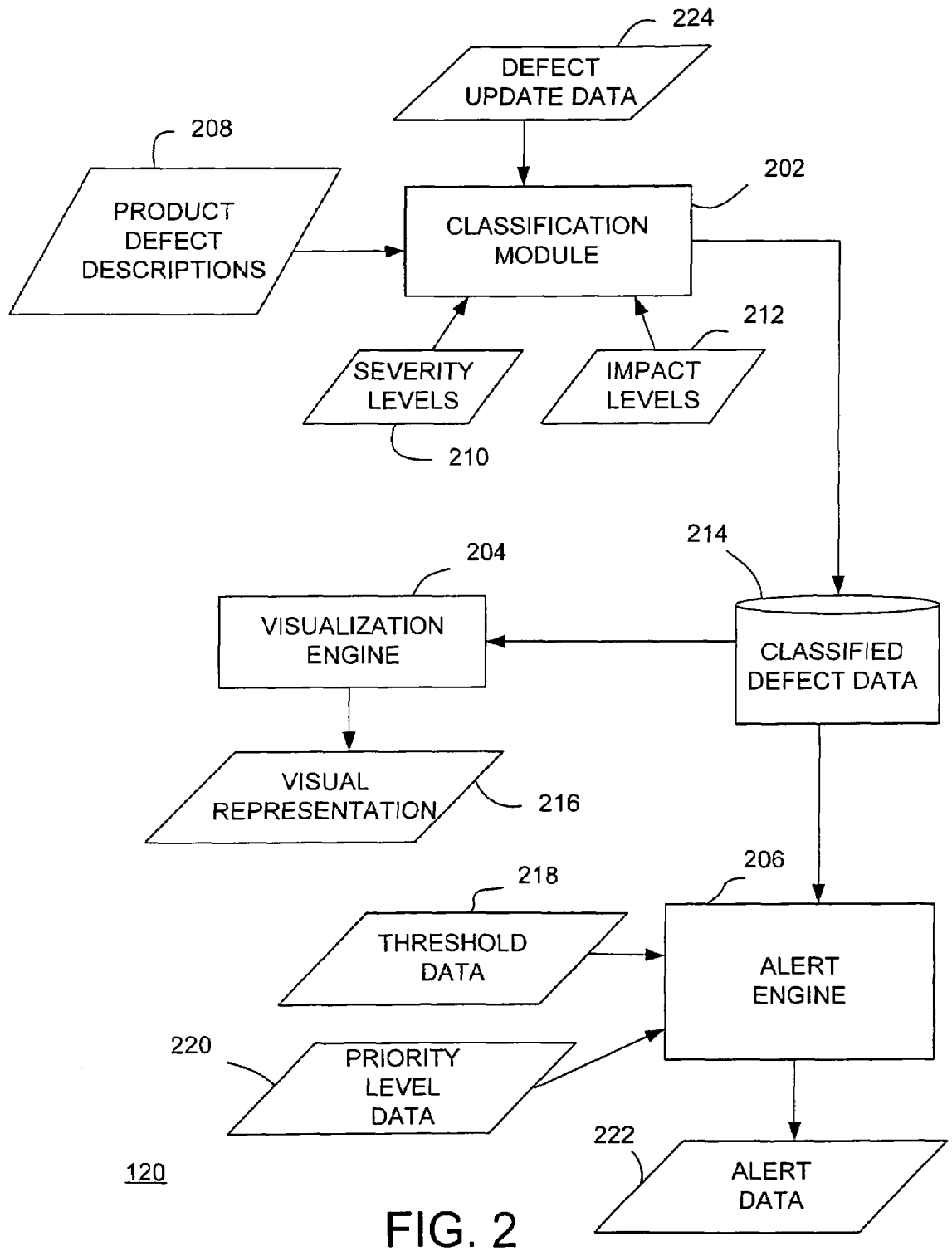
FIG. 2 is a block diagram depicting an exemplary embodiment of the defect classification system in accordance with one or more aspects of the invention.

FIG. 2 is a block diagram depicting an exemplary embodiment of the defect classification system 120 in accordance with one or more aspects of the invention. The defect classification system 120 includes a classification module 202, a visualization engine 204, and an alert engine 206. The classification module 202 is configured to receive product defect descriptions 208. The product defect descriptions 208 include information about various defects associated with a particular product. For example, assume the product comprises a networking device, such as a broadband modem (e.g., a cable modem). An exemplary defect description for the networking device is: "Device does not function with a particular model router." The product defect descriptions 208 may be obtained from various external systems, as described above.

The classification module 202 is also configured to receive severity rule data 210 and impact rule data 212. The severity rule data 210 defines a plurality of severity levels assignable product defects. Severity is defined as the seriousness of a defect from the point of view of the end users of the product. Severity is not altered by the technical nature of the underlying defect. For example, if a defect is especially difficult to fix, or requires extensive hardware changes, the severity is not altered. Also, the likelihood of encountering a defect does not affect severity (N.B., this is captured in the impact classification, discussed below). Severity includes not only how the product functions "stand-alone," but also how it functions within the end user environment. For example, if a networking product does not function when used in conjunction with an end user's existing home network without removing or reconfiguring other devices, this would be considered a defect.

Severity is not dictated by product requirement specifications, but rather by expected performance from an end user point of view. For example, end users may have an expectation that a product performs a certain way. If the product does not function as expected, then this is a defect from the end user point of view, even if the product is functioning as designed. The root cause of the defect may be inadequate product specification or inadequate documentation, but it is a defect none-the-less.

In one embodiment, the severity rule data 210 defines five severity levels. A first severity level (S1) represents the most severe defect. For example, the product or some core functionality of the product is inoperative and there is no workaround. A defect having an S1 severity level will very likely generate both technical support calls and returns of product. A second severity level (S2) is less severe than the S1 level. For example, the product requires a workaround to regain core functionality or a non-core function is inoperative, but the end user is still able to use the core functions of the product. A workaround is not easy or trivial. A defect having an S2 severity level will likely generate technical support calls and may generate returns of product.

A third severity level (S3) is less severe than the S2 level. For example, some feature of the product is confusing to use or is apt to be used incorrectly. The product requires a trivial workaround to recover a non-core function. A defect having an S3 severity level may generate technical support calls. A fourth severity level (S4) is less severe than the S3 level. For example, defects having an S4 severity level may relate to "fit and finish" issues. Product appearance, function, or performance is not as the end user expects or desires or is substandard to what would reasonably be expected of the product brand. A defect having the S4 severity level is not likely to generate support calls.

A fifth severity level (S5) is less severe than the S4 level. For example, defects having an S5 severity level may relate to enhancement issues. That is, the product may be enhanced if it had a particular feature, but is otherwise functioning as expected by the end user. Those skilled in the art will appreciate that the severity rule data 210 may include any number of severity levels having various criteria other than those listed above. In general, the severity levels are defined with respect to expected performance of the product from an end user point of view.

The following are some exemplary defects and corresponding severity levels for a networking device, such as a telephony device:

1) Product does not function with a particular model router: Severity 1;

2) Second line of two-line phone system does not ring if first line is off hook: Severity 1;

3) Product requires a router to be upgraded in order to function: Severity 2;

4) Product requires a static internet protocol (IP) address to be manually configured to function: Severity 2;

5) Product's phone book is not intuitive to use and causes users to lose entries: Severity 3;

6) Product has minor surface blemish on a secondary surface: Severity 4;

7) Product's screen saver should be configurable: Severity 5.

The impact rule data 212 defines a plurality of impact levels assignable product defects. Impact quantifies how likely end users are to encounter a particular defect. In one embodiment, impact is a combination of two main factors: (1) the percentage of the end user base that can experience the defect; and (2) the likelihood of an end user who could encounter the problem actually encountering the defect. For example, a product may include a defect that all end users experience if they use the product is an unusual way. A product may include a defect that affects all end users who have a particular third-party product, albeit a third-party product with a small market share. In both of these examples, the overall impact is lower than it might otherwise be.

In one embodiment, the impact rule data 212 defines five impact levels. The five impact levels are based on the estimated percentage of end users who will encounter the defect. A first impact level (I1) represents the most impact. For example, 20-100% of the end users will encounter an I1 defect. A second impact level (I2) represents less impact than the I1 level. For example, 5-20% of the end users will encounter an I2 defect. A third impact level (I3) represents less impact that the I2 level. For example, 2-5% of the end users will encounter an I3 defect. A fourth impact level (I4) represents less impact that the I3 level. For example, 0.5-2% of the end users will encounter an I4 defect. Finally, a fifth impact level (I5) represents less impact that the I4 level. For example, less than 0.5% of the end users will encounter an I5 defect. Those skilled in the art will appreciate that the impact rule data 212 may include any number of impact levels having various impact percentages or percentage ranges other than those listed above. In general, the impact levels are based on the estimated percentage of end users who will encounter the defect.

The classification module 202 assigns a severity level and an impact level to each defect in the product defect descriptions 208. For example, each product defect description may be displayed to a user on a GUI and the user may assign a corresponding severity level and impact level in accordance with the severity rule data 210 and the severity rule data 212. The classification module 202 may assign various other types of information to each defect in the product defect descriptions 208, such as defect identifiers, company reference numbers, notes related to the defects, and the like. The classification module 202 produces classified defect data 214 as output. The classified defect data 214 may be stored in a database for further processing, as described below.

Figure 3:
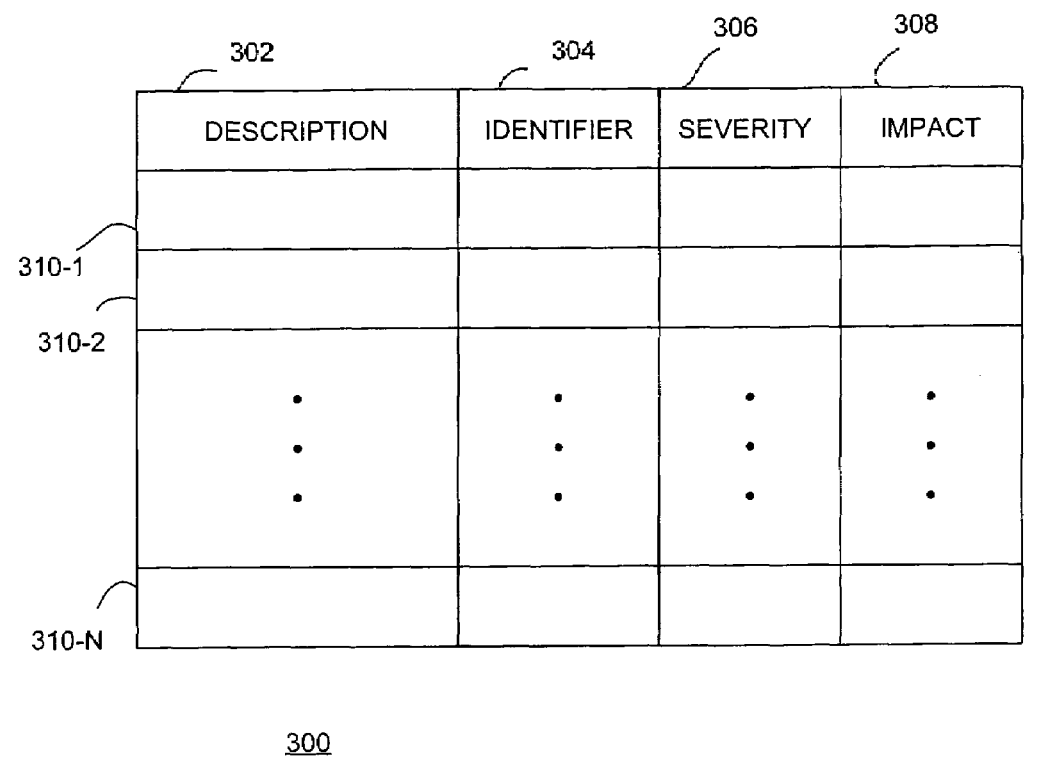

FIG. 3 illustrates an exemplary format 300 for the classified defect data 214 in accordance with one or more aspects of the invention. The format 300 includes columns 302 through 308, and rows 310-1 through 310-N (collectively rows 310), where N is an integer greater than zero. The rows 310 correspond to the defects for a given product (e.g., there are N defects in the present example). The column 302 includes a description for each defect (e.g., "product does not function with a particular model router"). The column 304 includes an identifier for each defect (e.g., a defect ID number, a company reference number, and like). The column 306 includes a severity level for each defect (e.g., S1 through S5). The column 308 includes an impact level for each defect (e.g., I1 through I5). Those skilled in the art will appreciate that the format 300 may include less columns then shown and/or columns for other types of information associated with each defect (e.g., defect notes). The format 300 may be used to depict the classified defect data 214 in a GUI, as described in an example below.

Returning to FIG. 2, the classified defect data 214 may be updated periodically. The classification module 202 is configured to receive defect update data 224. The defect update data 224 may include updated descriptions for particular defects, updated status for particular defects (e.g., the defect has been corrected), and the like. The defect update data 224 may be displayed to a user on a GUI and the user may update the severity level and/or impact level in accordance with the severity rule data 210 and the severity rule data 212. The defect description and/or other information associated with each defect may also be updated based on the defect update data 224.

For example, if a defect for a particular product is generating technical support calls with questions or complaints, it may be necessary to change the severity level to a higher severity level. In another example, some defects may not affect product functionality are thus initially assigned a low severity level (e.g., an S5). However, it may be determined later that the defects have such an adverse effect on the end user's perception of the product brand that the severity levels need to be elevated. For example, if a product contained a defect where the brand name was misspelled on the product, the defect may be elevated to a S1 severity level.

The visualization engine 204 is configured to receive the classified defect data 214. The visualization engine 204 automatically generates a graphic representation of a topographical relation among the classified defects for a particular product ("visual representation 216"). For example, each defect may be classified into a particular category based on severity level and impact level. If there are five severity levels and five impact levels, there are 25 possible categories to which a defect belongs. In particular, the categories include (S1,I1)...(S1,I5), (S2,I1)...(S2,I5), and so on until (S5,I1)...(S5,I5). For a given product, there is a particular number defects in each category (including zero defects). In one embodiment, the graphic comprises a histogram. The bins of the histogram correspond to the possible categories among which the defects are distributed. The histogram is three dimensional having first and second axes for the severity level and impact level, which define the bins of the histogram. A third axis represents a number of defects in a given bin. The visual representation 216 may be displayed on a GUI to a user. The visual representation 216 advantageously provides an overall view of the state of a product with respect to product defects. The visual representation 216 provides a concise view of the classified defect data 214.

Figure 4:
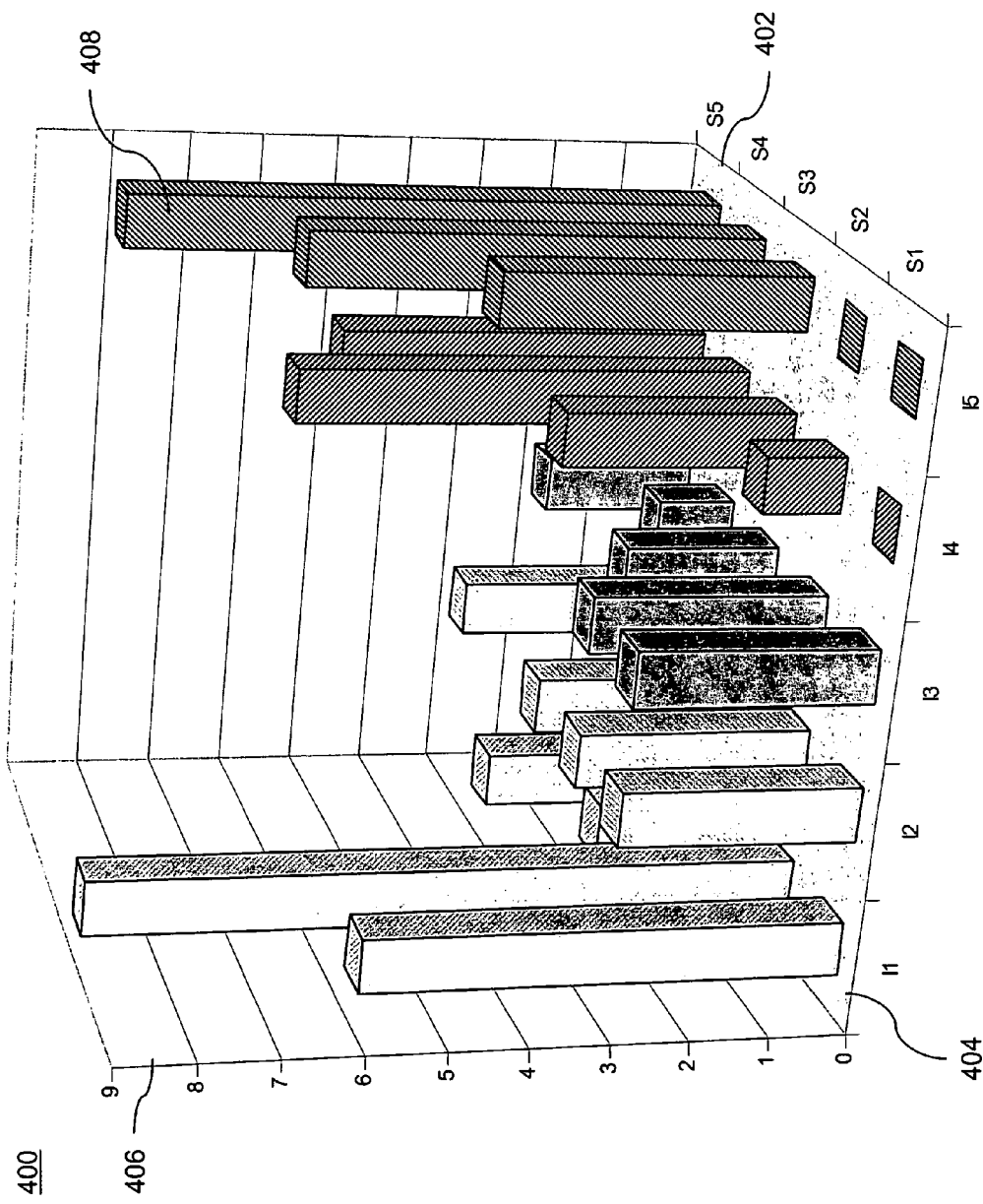
FIG. 4 illustrates an exemplary graphic for a visual representation in accordance with one or more aspects of the invention.

FIG. 4 illustrates an exemplary graphic 400 for the visual representation 216 in accordance with one or more aspects of the invention. The graphic 400 comprises a three-dimensional bar chart having an axis 402 representing severity level, an axis 404 representing impact level, and an axis 406 representing a number of defects. The graphic 400 includes bars 408 representative of a number of defects in a particular category for the product. The product in the present example does not include any defects in the (S1,I1), (S2,I1), and (S1,I2) categories. Conversely, the product includes eight defects in the (S5,I1) category and nine defects in the (S2,I5) category. The graphic 400 is merely exemplary, as each product will have various numbers of defects spread across various categories.

Returning to FIG. 2, the alert engine 206 is configured to receive the classified defect data 214. In one embodiment, the alert engine 206 is further configured to receive threshold data 218. Notably, the threshold data 218 includes a threshold number of defects for each possible severity level/impact level category. Each threshold may range from zero defects to any number of defects. For example, the (S1,I1) category may have a threshold of zero defects, since these defects are the most severe and have the most impact. The (S5,I5) category may have a higher threshold number of defects, since these defects are the least severe and have the least impact. The alert engine 206 is configured to compare the number of defects in each of the categories with the threshold assigned thereto. For any category, if the number of defects exceeds the assigned threshold, an alert graphic is generated. The alert graphic may comprise any type of text, images, or combination thereof for display on a GUI. For example, the alert graphic may include text indicating that the number of defects in a particular category has exceeded a threshold number of defects. The alert engine 206 generates alert data 222 for display on a GUI.

In one embodiment, the alert engine 206 is further configured to receive priority level data 220. The priority level data 220 includes a plurality of priority levels associated with particular severity level/impact level categories. For example, a highest priority level (P1) may require immediate action (e.g., action within hours). A lower priority level (P2) may require an action be taken in an emergency change control board (CCB) meeting. As used herein, a "CCB meeting" is a meeting to discuss and plan product changes. A lowest priority level (P3) may require an action to be taken in a regularly scheduled CCB meeting. Those skilled in the art will appreciate that other types of priority levels may be defined with respect to other types of actions to be taken in response to a particular category of defect.

A particular alert graphic generated by the alert engine 206 may further include text recommending a particular action based on priority level for the defect. For example, an (S1,I1) defect affects a large percentage of end users in such a way that the end users cannot use the product. Therefore, if a defect in this category is discovered, it will require immediate attention to determine the appropriate action (e.g., such a category is assigned a P1 priority level). A triggered alert graphic may include the text "Immediate action required." An (S2,I1) or an (S2,I2) defect may be important enough to merit an emergency CCB meeting to determine what further action may be may not be necessary (e.g., such categories are assigned a P2 priority level). It may not be sufficient to wait for the next scheduled CCB meeting. A triggered alert graphic for these categories may include the text "Emergency CCB meeting required." Defects in other categories may be discussed in a regularly scheduled CCB meeting (e.g., such categories are assigned a P3 priority level). A triggered alert for these categories may include the text "Discuss at next scheduled CCB meeting." Those skilled in the art will appreciate that the severity level/impact level categories may be assigned different priority levels than the examples above.

Figure 5:
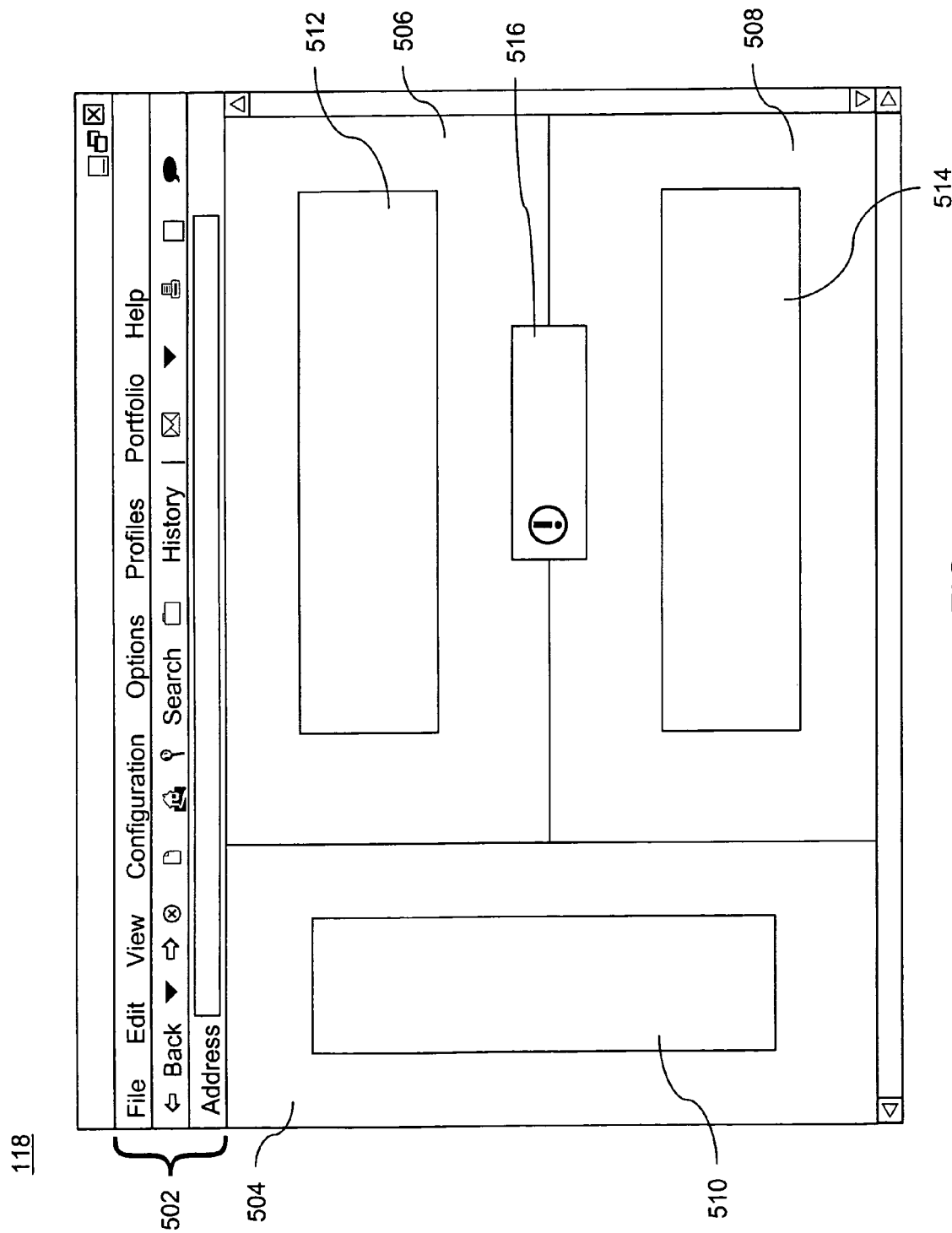
FIG. 5 illustrates an exemplary embodiment of a graphical user interface (GUI) in accordance with one or more aspects of the invention.

FIG. 5 illustrates an exemplary embodiment of the GUI 118 in accordance with one or more aspects of the invention. The GUI 118 includes an I/O interface 502, a defect description pane 504, a classified defect pane 506, and a visual representation pane 508. The I/O interface 502 includes, for example, a menu bar, a tool bar, and like type GUI user interface components known in the art. The defect description pane 504 is configured to display a list 510 of defect descriptions for a product. The classified defect pane 506 is configured to display a chart 512 of classified defects for the product. For example, the chart 512 may be formatted as shown in FIG. 3. A user may employ a mouse and/or keyboard to classify particular defects in the list 510 to produce the chart 512. The visual representation pane 508 includes a graphic 514 showing a topographical relation among the classified defects. For example, the graphic 514 may be formatted as shown in FIG. 4. A user may employ a mouse and/or keyboard to generate the graphic 514. Alternatively, the graphic 514 may be updated automatically as the chart 512 is updated. The GUI 118 is further configured to display an alert graphic 516 in response to a number of defects in a particular category exceeding an assigned threshold for that category.

Figure 6:
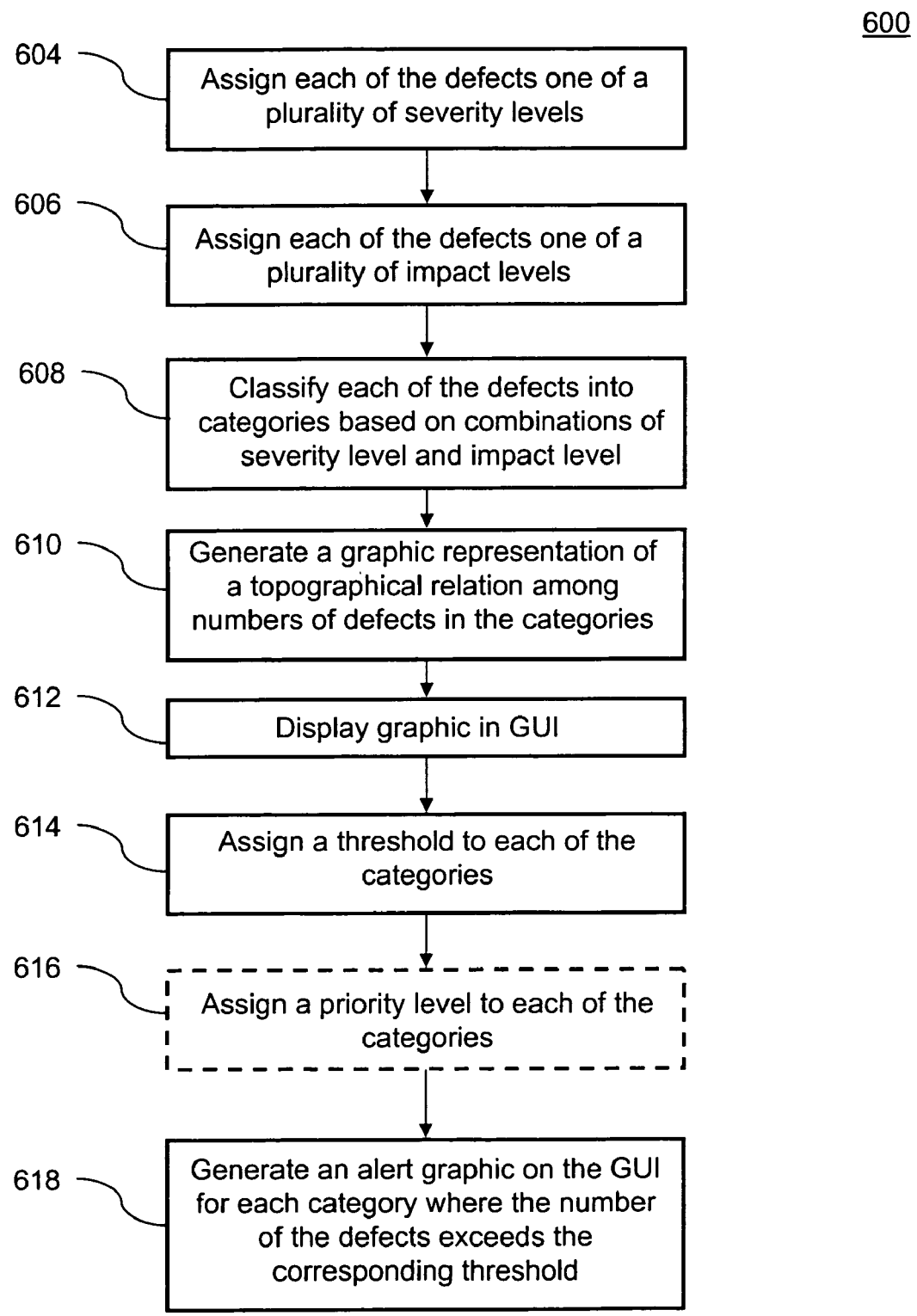
FIG. 6 is a flow diagram depicting an exemplary embodiment of a method for processing defect data indicative of defects in a product in accordance with one or more aspects of the invention.

FIG. 6 is a flow diagram depicting an exemplary embodiment of a method 600 for processing defect data indicative of defects in a product in accordance with one or more aspects of the invention. The method 600 begins at step 604, where each of the defects is assigned one of a plurality of severity levels. At step 606, each of the defects is assigned one of a plurality of impact levels. At step 608, the defects are classified into categories based on combinations of severity level and impact level. At step 610, a graphic representative of a topographical relation among numbers of defects in the categories is generated. At step 612, the graphic is displayed on a GUI. At step 614, a threshold is assigned to each of the categories. At optional step 616, a priority level is assigned to each of the categories. At step 618, an alert graphic is generated on the GUI for each category where the number of defects therein exceeds the corresponding threshold. The alert graphic may include a recommended action based on the priority level assigned to the category.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of processing defect data indicative of defects in a product, comprising:
   receiving defect data from an end-user, wherein the defect data is indicative of defects in a product at an end-user's environment;
   assigning each of the defects one of a plurality of severity levels;
   assigning each of the defects one of a plurality of impact levels;
   classifying the defects into categories based on combinations of severity level and impact level;
   automatically generating a graphic representative of a topographical relation among numbers of defects in the categories; and
   displaying the graphic on a graphical user interface (GUI);
   wherein the graphic comprises a histogram having a first axis representing severity level, a second axis representing impact level, and a third axis representing a number of defects, the first axis and the second axis defining bins respectively associated with the categories.

2. The method of claim 1, wherein the histogram comprises a three-dimensional bar chart.

3. The method of claim 1, wherein each of the plurality of impact levels is associated with an estimated percentage of customers impacted by a corresponding defect.

4. The method of claim 1, wherein the plurality of severity levels are defined with respect to expected performance of the product from an end-user point of view.

5. A method of processing defect data indicative of defects in a product, comprising:
   receiving defect data from an end-user, wherein the defect data is indicative of defects in a product at an end-user's environment;
   assigning each of the defects one of a plurality of severity levels;
   assigning each of the defects one of a plurality of impact levels;
   classifying the defects into categories based on combinations of severity level and impact level;
   automatically generating a graphic representative of a topographical relation among numbers of defects in the categories;
   displaying the graphic on a graphical user interface (GUI);
   assigning a threshold to each of the categories;
   comparing the number of defects in each of the categories with the threshold assigned thereto;
   automatically displaying, for each category of the categories where the number of defects therein exceeds the threshold assigned thereto, an alert graphic on the GUI; and
   assigning each of the categories a priority level;

wherein an action is displayed for each alert graphic based on the priority level assigned to the category.

6. The method of claim 5, wherein each of the plurality of impact levels is associated with an estimated percentage of customers impacted by a corresponding defect.

7. The method of claim 5, wherein the plurality of severity levels are defined with respect to expected performance of the product from an end-user point of view.

8. Apparatus for processing defect data indicative of defects in a product, comprising:
   means for receiving defect data from an end-user, wherein the defect data is indicative of defects in a product at an end-user's environment;
   means for assigning each of the defects one of a plurality of severity levels;
   means for assigning each of the defects one of a plurality of impact levels;
   means for classifying the defects into categories based on combinations of severity level and impact level;
   means for automatically generating a graphic representative of a topographical relation among numbers of defects in the categories; and
   means for displaying the graphic on a graphical user interface (GUI);
   wherein the graphic comprises a histogram having a first axis representing severity level, a second axis representing impact level, and a third axis representing a number of defects, the first axis and the second axis defining bins respectively associated with the categories.

9. The apparatus of claim 8, wherein each of the plurality of impact levels are defined with respect to expected performance of the product from an end-user point of view.

10. The apparatus of claim 8, wherein the plurality of severity levels are defined with respect to expected performance of the product from an end-user point of view.

11. Apparatus for processing defect data indicative of defects in a product, comprising:
   means for receiving defect data from an end-user, wherein the defect data is indicative of defects in a product at an end-user's environment;
   means for assigning each of the defects one of a plurality of severity levels;
   means for assigning each of the defects one of a plurality of impact levels;
   means for classifying the defects into categories based on combinations of severity level and impact level;
   means for automatically generating a graphic representative of a topographical relation among numbers of defects in the categories;
   means for displaying the graphic on a graphical user interface (GUI);
   means for assigning a threshold to each of the categories;
   means for comparing the number of defects in each of the categories with the threshold assigned thereto;
   means for automatically displaying, for each category of the categories where the number of defects therein exceeds the threshold assigned thereto, an alert graphic on the GUI; and
   means for assigning each of the categories a priority level;
   wherein an action is displayed for each alert graphic based on the priority level assigned to the category.

12. The apparatus of claim 11, wherein each of the plurality of impact levels are defined with respect to expected performance of the product from an end-user point of view.

13. The apparatus of claim 11, wherein the plurality of severity levels are defined with respect to expected performance of the product from an end-user point of view.

14. A computer readable storage medium having stored thereon program instructions that, when executed by a processor, cause the processor to perform a method of:
   receiving defect data from an end-user, wherein the defect data is indicative of defects in a product at an end-user's environment;
   assigning each of the defects one of a plurality of severity levels;
   assigning each of the defects one of a plurality of impact levels;
   classifying the defects into categories based on combinations of severity level and impact level;
   automatically generating a graphic representative of a topographical relation among numbers of defects in the categories; and
   displaying the graphic on a graphical user interface (GUI);
   wherein the graphic comprises a histogram having a first axis representing severity level, a second axis representing impact level, and a third axis representing a number of defects, the first axis and the second axis defining bins respectively associated with the categories.

15. The computer readable storage medium of claim 14, wherein each of the plurality of impact levels is associated with an estimated percentage of customers impacted by a corresponding defect.

16. The computer readable storage medium of claim 14, wherein the plurality of severity levels are defined with respect to expected performance of the product from an end-user point of view.

17. A computer readable storage medium having stored thereon program instructions that, when executed by a processor, cause the processor to perform a method of:
   receiving defect data from an end-user, wherein the defect data is indicative of defects in a product at an end-user's environment;
   assigning each of the defects one of a plurality of severity levels;
   assigning each of the defects one of a plurality of impact levels;
   classifying the defects into categories based on combinations of severity level and impact level;
   automatically generating a graphic representative of a topographical relation among numbers of defects in the categories;
   displaying the graphic on a graphical user interface (GUI);
   assigning a threshold to each of the categories;
   comparing the number of defects in each of the categories with the threshold assigned thereto; and
   automatically displaying, for each category of the categories where the number of defects therein exceeds the threshold assigned thereto, an alert graphic on the GUI; and
   assigning each of the categories a priority level;
   wherein an action is displayed for each alert graphic based on the priority level assigned to the category.

18. The computer readable storage medium of claim 17, wherein each of the plurality of impact levels is associated with an estimated percentage of customers impacted by a corresponding defect.

19. The computer readable storage medium of claim 17, wherein the plurality of severity levels are defined with respect to expected performance of the product from an end-user point of view.

* * * * *